United States Patent
Ukegawa

(10) Patent No.: US 10,180,849 B2
(45) Date of Patent: Jan. 15, 2019

(54) APPARATUS, INFORMATION PROCESSING SYSTEM, INFORMATION PROCESSING METHOD, AND COMPUTER PROGRAM PRODUCT

(71) Applicant: Junji Ukegawa, Kanagawa (JP)

(72) Inventor: Junji Ukegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/571,155

(22) PCT Filed: Jun. 7, 2016

(86) PCT No.: PCT/JP2016/002758
§ 371 (c)(1),
(2) Date: Nov. 1, 2017

(87) PCT Pub. No.: WO2016/208134
PCT Pub. Date: Dec. 29, 2016

(65) Prior Publication Data
US 2018/0173543 A1 Jun. 21, 2018

(30) Foreign Application Priority Data
Jun. 23, 2015 (JP) .................. 2015-125388

(51) Int. Cl.
*G06F 9/451* (2018.01)
*G06F 3/12* (2006.01)
(Continued)

(52) U.S. Cl.
CPC .............. *G06F 9/451* (2018.02); *B41J 29/00* (2013.01); *B41J 29/38* (2013.01);
(Continued)

(58) Field of Classification Search
CPC .... G06F 9/451; G06F 3/04817; G06F 3/1231; B41J 29/00; B41J 29/38; B41J 3/46;
(Continued)

(56) References Cited

U.S. PATENT DOCUMENTS

| 9,442,709 B1* | 9/2016 | Delker ................ G06F 8/61 |
| 2002/0120679 A1* | 8/2002 | Hayton ................ G06F 8/38 709/203 |

(Continued)

FOREIGN PATENT DOCUMENTS

| EP | 1553525 | 7/2005 |
| EP | 1874027 | 1/2008 |

(Continued)

OTHER PUBLICATIONS

International Search Report dated Jul. 12, 2016 in PCT/JP2016/002758 filed on Jun. 7, 2016.

(Continued)

*Primary Examiner* — Allen H Nguyen
(74) *Attorney, Agent, or Firm* — IPUSA, PLLC

(57) ABSTRACT

An apparatus is provided. The apparatus includes an identifying unit configured to, by referring to information in which a permission type a user of the apparatus has with respect to an operation of the apparatus is indicated for identification information of the user, identify the permission type corresponding to the identification information input by the user; and a display control unit configured to display a screen based on screen configuration information corresponding to the permission type identified by the identifying unit. The screen configuration information item corresponding to the permission type is stored in a storage unit.

10 Claims, 14 Drawing Sheets

(51) Int. Cl.
*G06F 3/0481* (2013.01)
*H04N 1/00* (2006.01)
*B41J 29/00* (2006.01)
*B41J 29/38* (2006.01)
*B41J 3/46* (2006.01)

(52) U.S. Cl.
CPC ........ *G06F 3/04817* (2013.01); *G06F 3/1231* (2013.01); *H04N 1/00411* (2013.01); *H04N 1/00424* (2013.01); *H04N 1/00509* (2013.01); *B41J 3/46* (2013.01)

(58) Field of Classification Search
CPC . B41J 3/04817; B41J 3/1231; H04N 1/00411; H04N 1/00424; H04N 1/00509
USPC ........................................................ 358/1.13
See application file for complete search history.

(56) References Cited

U.S. PATENT DOCUMENTS

| | | | | |
|---|---|---|---|---|
| 2006/0026434 A1* | 2/2006 | Yoshida | ................ | G06F 21/608 713/182 |
| 2006/0221858 A1* | 10/2006 | Switzer | ................... | G06F 9/451 370/254 |
| 2007/0136293 A1 | 6/2007 | Mizumukai | | |
| 2007/0140557 A1* | 6/2007 | Osada | ................... | G06F 21/608 382/167 |
| 2008/0141148 A1 | 6/2008 | Ogita | | |
| 2009/0251724 A1* | 10/2009 | Nakajima | ............. | G06F 21/608 358/1.15 |
| 2010/0115608 A1* | 5/2010 | Uchikawa | ............... | G06F 21/84 726/18 |
| 2010/0290071 A1 | 11/2010 | Okada et al. | | |
| 2015/0007109 A1 | 1/2015 | Yun | | |
| 2015/0101025 A1* | 4/2015 | Murata | ................... | G06F 21/10 726/4 |

FOREIGN PATENT DOCUMENTS

| | | |
|---|---|---|
| EP | 1903767 | 3/2008 |
| JP | 2006-202009 | 8/2006 |
| JP | 2008-167417 | 7/2008 |
| JP | 2011-142640 | 7/2011 |
| JP | 2013-184347 | 9/2013 |
| JP | 2013-257818 | 12/2013 |

OTHER PUBLICATIONS

Extended European Search Report for 16813910.3 dated Apr. 26, 2018.

* cited by examiner

[Fig. 1]
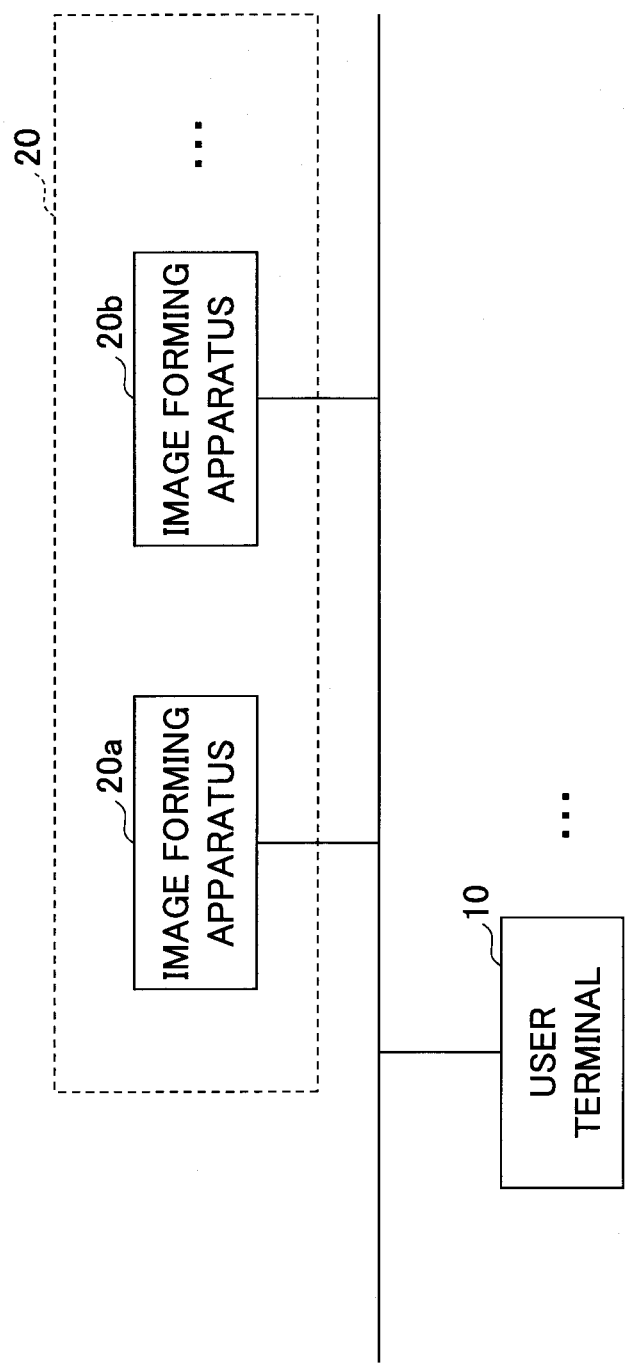

[Fig. 2]
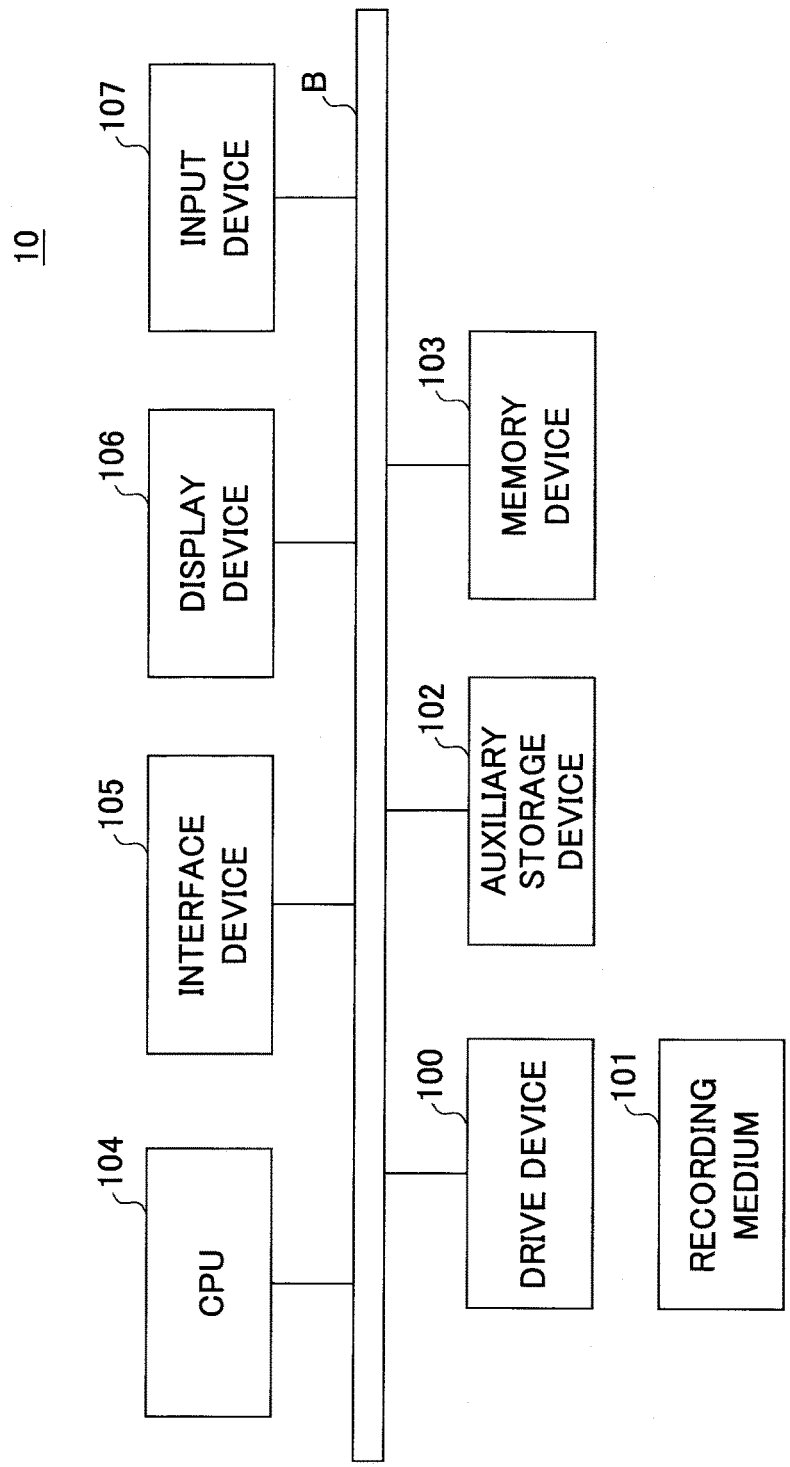

[Fig. 3]
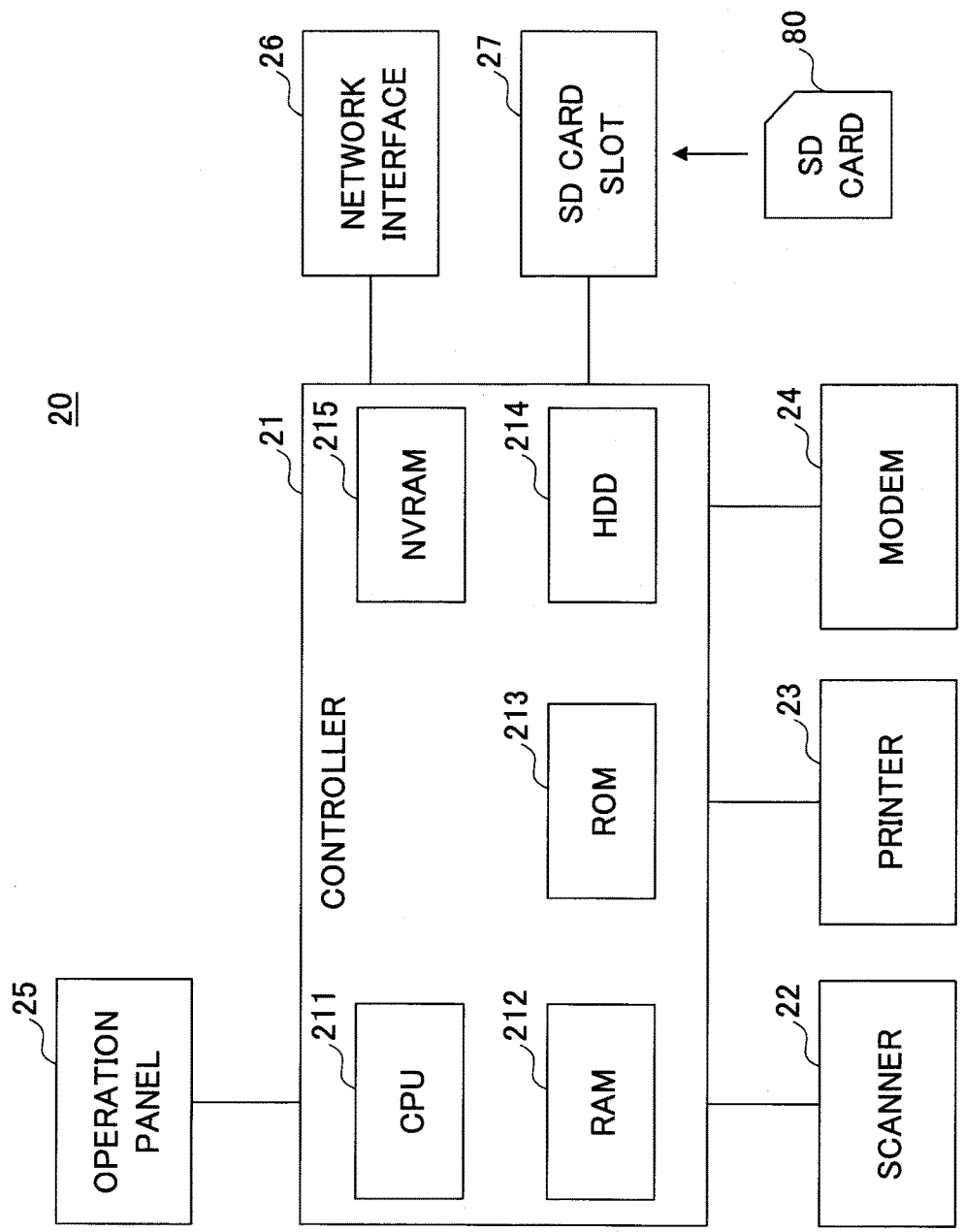

[Fig. 4]
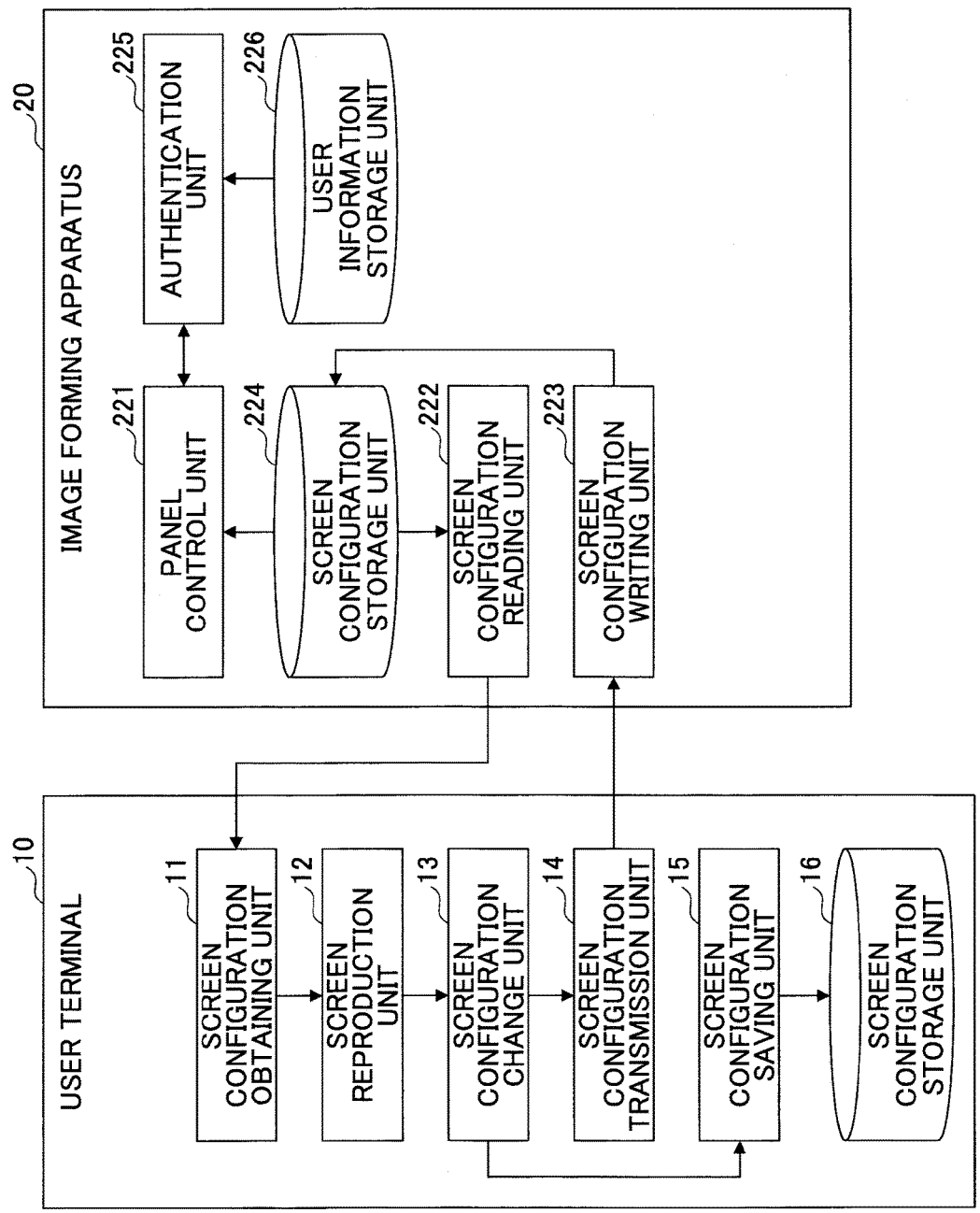

[Fig. 5]
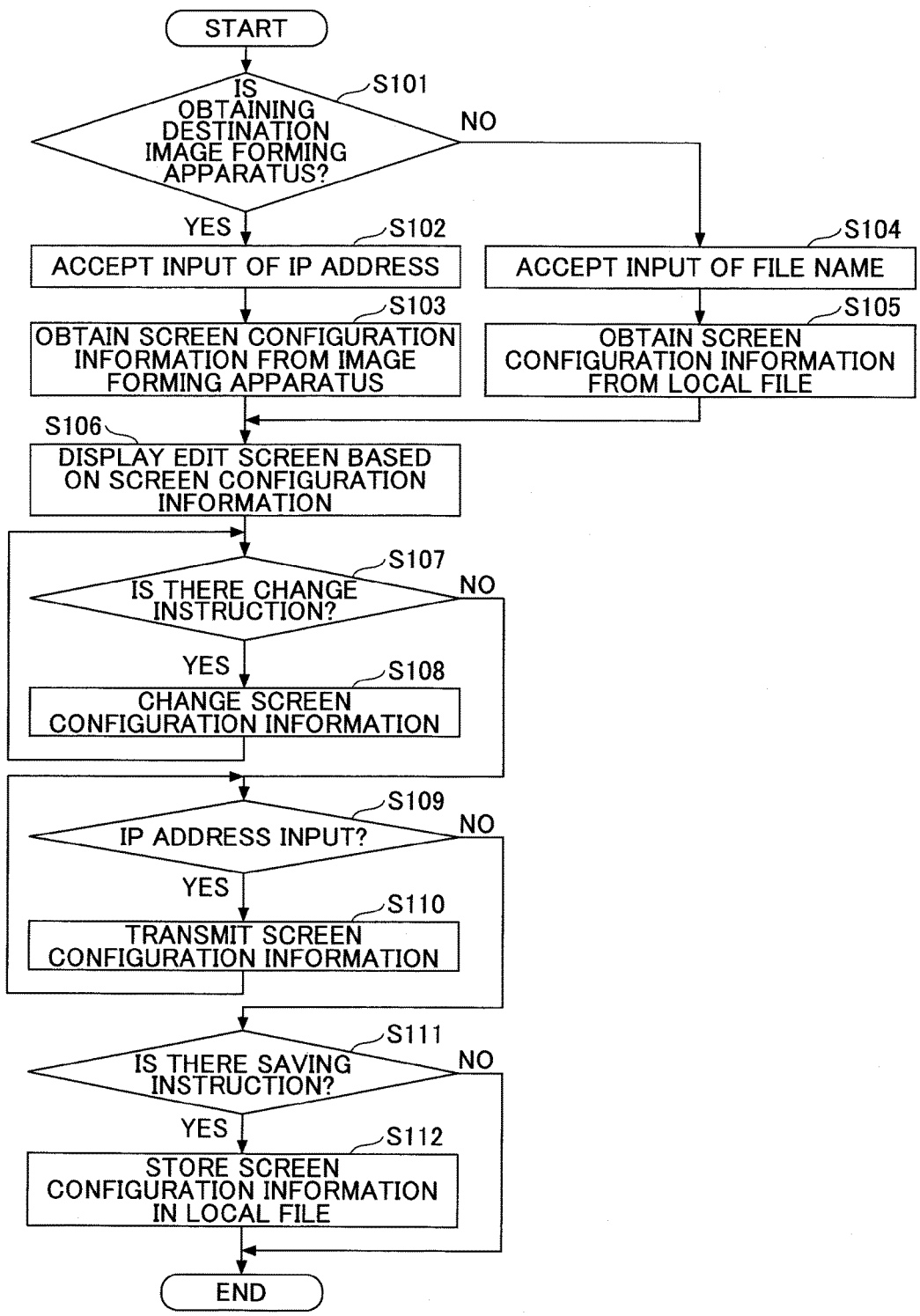

[Fig. 6]

| PERMISSION TYPE NAME | SCREEN CONFIGURATION INFORMATION 224 |
|---|---|
| GENERAL USER | SCREEN CONFIGURATION INFORMATION A |
| DEVICE ADMINISTRATOR | SCREEN CONFIGURATION INFORMATION B |
| NETWORK ADMINISTRATOR | SCREEN CONFIGURATION INFORMATION C |
| DOCUMENT ADMINISTRATOR | SCREEN CONFIGURATION INFORMATION D |
| CE | SCREEN CONFIGURATION INFORMATION E |
| ⋮ | ⋮ |

[Fig. 7]
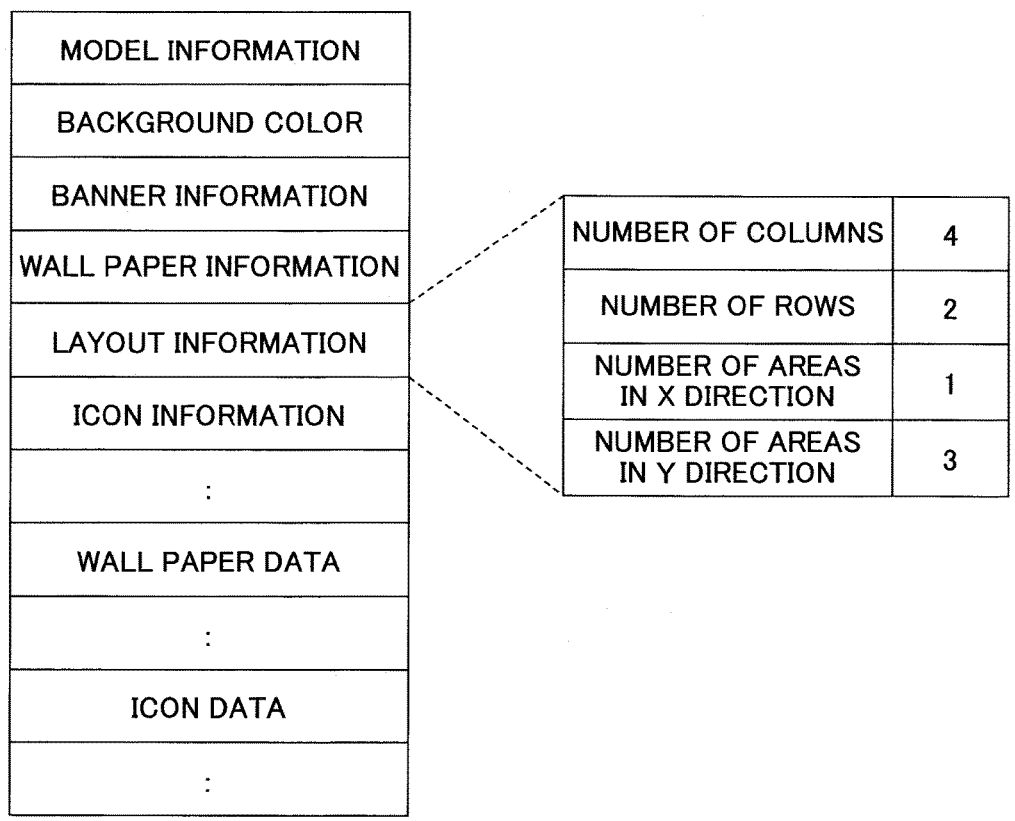

[Fig. 8]
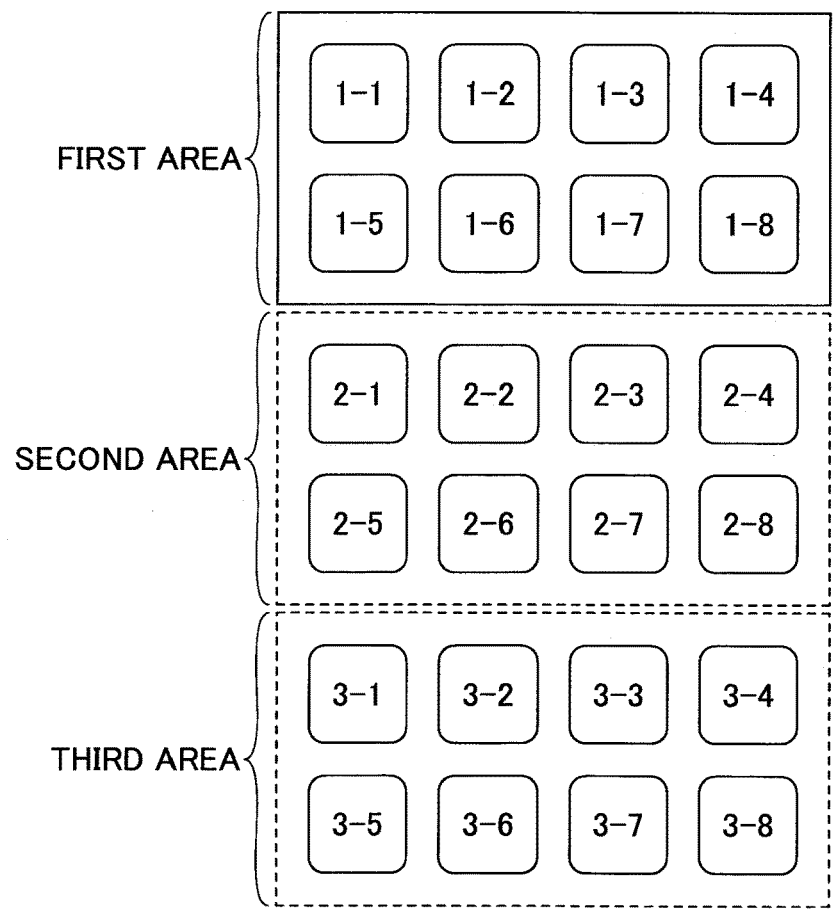
[Fig. 9A]
| TYPE | application |
|---|---|
| POSITION | 1-1 |
| ICON ID | 3 |
| APPLICATION ID | 15048295 |
| NAME | Copy |

[Fig. 9B]
| TYPE | widget |
|---|---|
| POSITION | (1-3,1-7) |
| APPLICATION ID | 42810405 |
| ICON DATA | ... |
[Fig. 9C]
| TYPE | url |
|---|---|
| POSITION | 2-2 |
| url | http://www.xxx.com |
| ICON DATA | ... |
[Fig. 10]
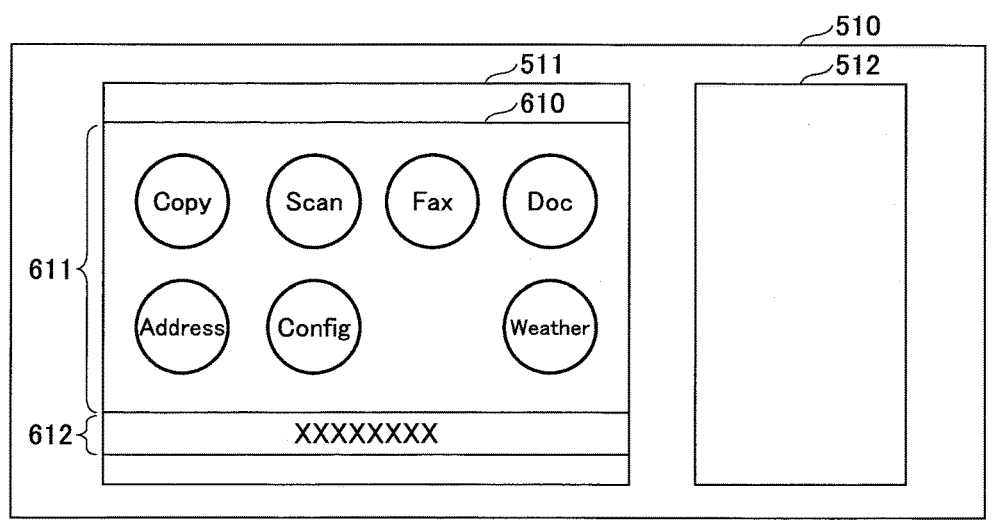

[Fig. 11]
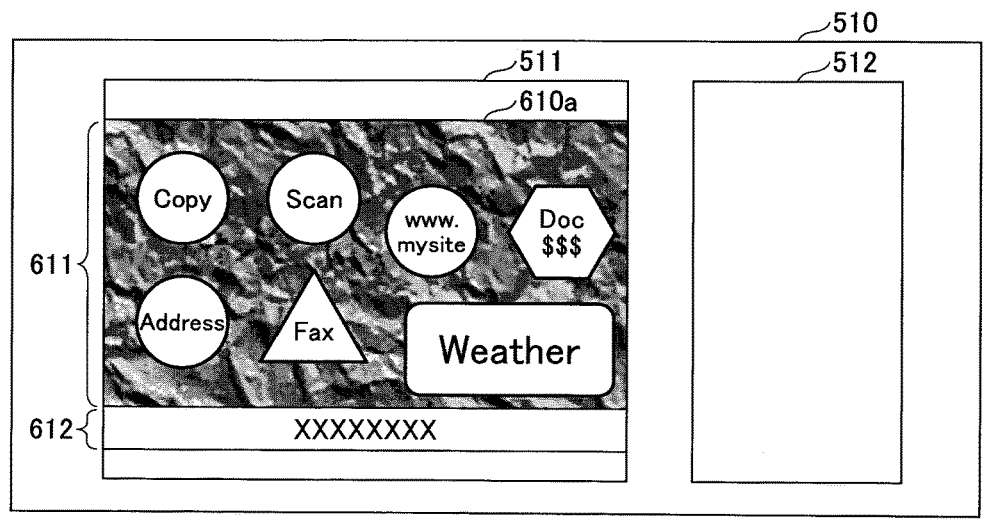

[Fig. 12]

| PERMISSION TYPE NAME | BANNER INFORMATION | WALL PAPER | BACKGROUND COLOR | LAYOUT INFORMATION | ICON INFORMATION |
|---|---|---|---|---|---|
| GENERAL USER | <USER NAME> LOGGING IN | WALL PAPER A | BLUE | ... | ... |
| DEVICE ADMINISTRATOR | DEVICE ADMINISTRATOR LOGGING IN | WALL PAPER B | PURPLE | ... | ... |
| NETWORK ADMINISTRATOR | NETWORK ADMINISTRATOR LOGGING IN | WALL PAPER C | PURPLE | ... | ... |
| DOCUMENT ADMINISTRATOR | DOCUMENT ADMINISTRATOR LOGGING IN | WALL PAPER D | PURPLE | ... | ... |
| CE | DEVICE UNDER MAINTENANCE | WALL PAPER E | GRAY | ... | ... |
| ... | ... | ... | ... | ... | ... |

[Fig. 13]
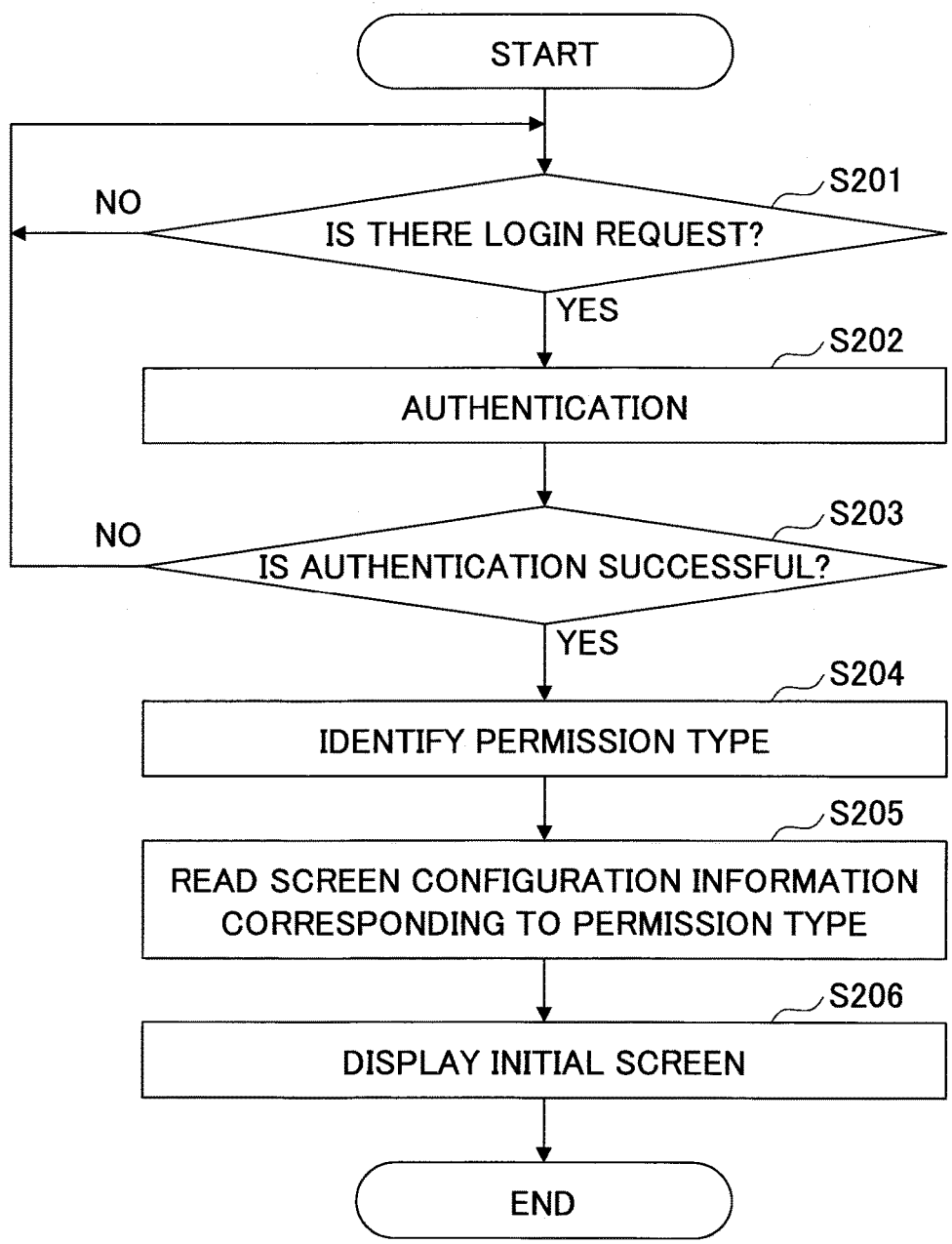

[Fig. 14]
| USER NAME | PASS WORD | PERMISSION TYPE NAME | ... 226 |
|---|---|---|---|
| AAA | ... | GENERAL USER | ... |
| BBB | ... | DEVICE ADMINISTRATOR | ... |
| : | : | : | : |
[Fig. 15]
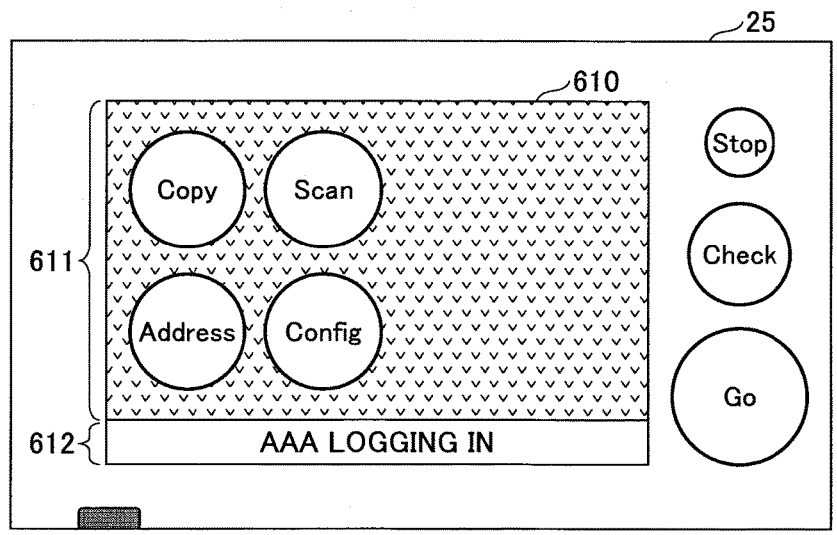

[Fig. 16]
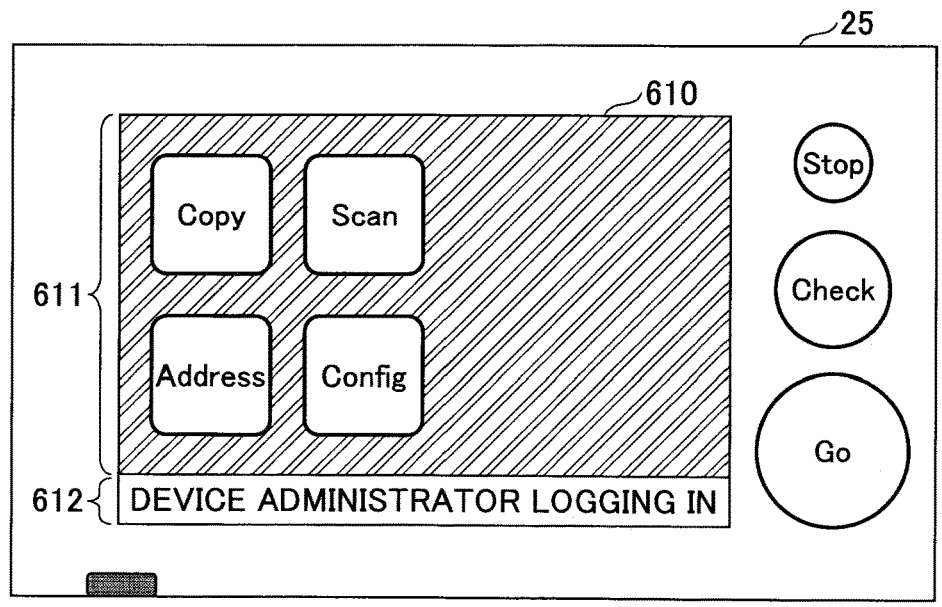
[Fig. 17]
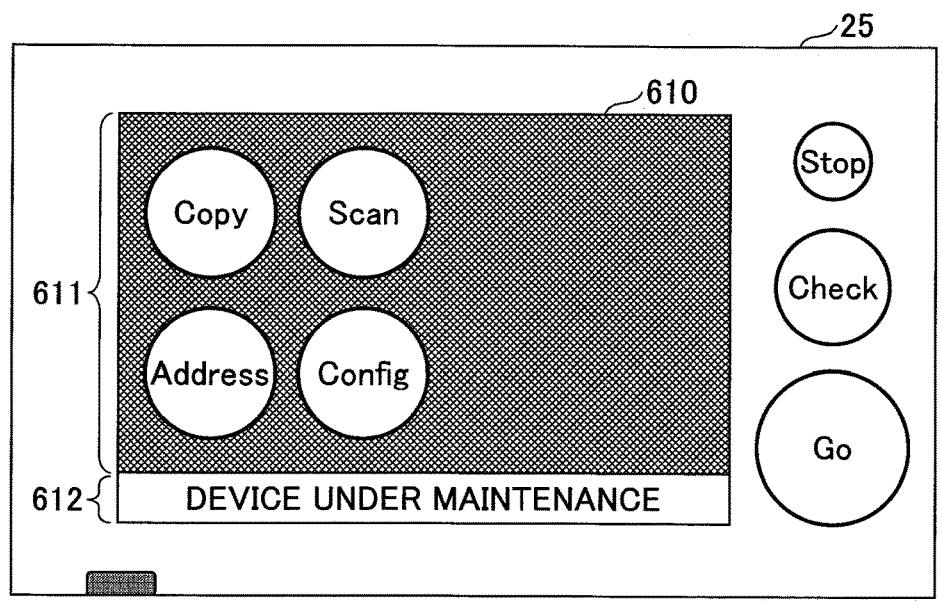

APPARATUS, INFORMATION PROCESSING SYSTEM, INFORMATION PROCESSING METHOD, AND COMPUTER PROGRAM PRODUCT

TECHNICAL FIELD

The present invention relates to an apparatus, information processing system, an information processing method, and a computer program product.

BACKGROUND ART

An apparatus such as an image forming apparatus can provide various functions. However, a user rarely uses all of the functions. Therefore, display contents of a screen displayed on an operation panel of the apparatus are complicated for most users.

In view of the above-mentioned points, an object of the present invention is to reduce operational load for changing a configuration of a screen displayed on an apparatus.

SUMMARY OF INVENTION

In view of the above, an apparatus is provided. The apparatus includes an identifying unit configured to, by referring to information in which a permission type a user of the apparatus has with respect to an operation of the apparatus is indicated for each user's identification information, identify the permission type corresponding to the user identification information input by the user; and a display control unit configured to display a screen based on a screen configuration information item corresponding to the permission type identified by the identifying unit, the screen configuration information items corresponding to the permission types being stored in a storage unit.

An embodiment of the present invention can reduce operational load for changing a configuration of a screen displayed on an apparatus.

BRIEF DESCRIPTION OF DRAWINGS

FIG. 1 is a drawing illustrating a system structure according to an embodiment of the present invention.

FIG. 2 is a drawing illustrating a hardware structure of a user terminal according to an embodiment of the present invention.

FIG. 3 is a drawing illustrating a hardware structure of an image forming apparatus according to an embodiment of the present invention.

FIG. 4 is a drawing illustrating a functional structure of the user terminal and the image forming apparatus.

FIG. 5 is a flowchart illustrating an example of a procedure performed by the user terminal.

FIG. 6 is a drawing illustrating a structure of a screen configuration storage unit.

FIG. 7 is a drawing illustrating a structure of screen configuration information.

FIG. 8 is a drawing illustrating layout of an initial screen.

FIG. 9A is a drawing illustrating a structure of icon information.

FIG. 9B is a drawing illustrating a structure of icon information.

FIG. 9C is a drawing illustrating a structure of icon information.

FIG. 10 is a drawing illustrating a display example of an edit screen.

FIG. 11 is a drawing illustrating a display example of an edit screen including an initial screen after change.

FIG. 12 is a drawing illustrating screen configuration information for each permission type name.

FIG. 13 is a flowchart illustrating a procedure performed by the image forming apparatus.

FIG. 14 is a drawing illustrating a structure of a user information storage unit.

FIG. 15 is a drawing illustrating a first display example of an initial screen.

FIG. 16 is a drawing illustrating a second display example of an initial screen.

FIG. 17 is a drawing illustrating a third display example of an initial screen.

DESCRIPTION OF EMBODIMENTS

An operation screen of a conventional apparatus may be customized for each user.

On the other hand, users of the apparatus may be classified according to permissions given to the users with respect to the apparatus operation. Functions of the apparatus available for a user vary according to the user's permission. Therefore, there is a case where users with the same permission may be satisfied with a common customization result.

However, there is another case where it may be necessary for each of the users with the same permission to have his/her own customization.

In the following, an embodiment of the present invention will be described referring to the drawings. FIG. 1 is a drawing illustrating a system structure according to an embodiment. In FIG. 1, one or more image forming apparatuses 20 including an image forming apparatus 20a, an image forming apparatus 20b, etc., and one or more user terminals 10 are connected via a network (wired or wireless) including a local area network (LAN), the Internet, etc., and are capable of communicating with each other.

The image forming apparatus 20 is a multifunction peripheral in which two or more functions of printing, scanning, copying, fax transmission and reception, etc., are realized in a chassis. The image forming apparatus 20 may, however, be an apparatus in which a single function of the above functions is included.

The user terminal 10 is a computer used by a user for changing a configuration of a screen displayed on an operation panel of the image forming apparatus 20. For example, a personal computer (PC), a mobile telephone, a smartphone, a tablet terminal, a personal digital assistant (PDA), etc., may be used as the user terminal 10.

FIG. 2 is a drawing illustrating a hardware structure of the user terminal 10 according to an embodiment. The user terminal 10 shown in FIG. 2 includes a drive device 100, an auxiliary storage device 102, a memory device 103, a CPU 104, an interface device 105, a display device 106, an input device 107, etc., which are connected to each other by a bus B.

A program which realizes a process in the user terminal 10 is provided by a recording medium 101 such as a CD-ROM, etc. When the recording medium 101 which stores the program is set in the drive device 100, the program is read from the recording medium 101 and installed in the auxiliary storage device 102 via the drive device 100. However, it is not always required that the program is installed from the recording medium 101, but it may be downloaded from another computer via a network. The auxiliary storage device 102 stores not only the installed program but also necessary files, data, etc.

The memory device 103 reads and stores the program from the auxiliary storage device 102 in the case where there is a program start instruction. The CPU 104 realizes functions of the user terminal 10 according to the program stored in the memory device 103. The interface device 105 is used for connecting to a network. The display device 106 displays a graphical user interface (GUI), etc., according to the program. The input device 107 includes a keyboard, a mouse, or the like, and is used for inputting various operational instructions.

FIG. 3 is a drawing illustrating a hardware structure of an image forming apparatus 20 according to an embodiment. As shown in FIG. 3, the image forming apparatus 20 includes hardware such as a controller 21, a scanner 22, a printer 23, a modem 24, an operation panel 25, a network interface 26, and an SD card slot 27.

The controller 21 includes a CPU 211, a RAM 212, a ROM 213, an HDD 214, NVRAM 215, etc. The ROM 213 stores various programs, data used by the programs, etc. The RAM 212 is used as a memory area for loading programs, as a work area of the loaded programs, etc. The CPU 211 realizes various functions by executing the loaded programs in the RAM 212. The HDD 214 stores programs, data used by the programs, etc. The NVRAM 215 stores various setting information items, etc.

The scanner 22 is hardware for reading image data from documents (image reading means). The printer is hardware for printing print data on a print sheet (printing means). The modem 24 is hardware for connecting to a telephone line, and used for transmission and reception of image data by FAX communications. The operation panel 25 is hardware including an input means such as a button for accepting an input from a user, and a display means such as a liquid crystal panel. The liquid crystal panel may have a touch panel function. In this case, the liquid crystal panel also functions as an input means. The network interface 26 is hardware for connecting to a network (wired or wireless) such as a LAN. The SD card slot 27 is used for reading programs stored in an SD card 80. In other words, not only programs stored in the ROM 213 but also programs stored in the SD card 80 may be loaded in the RAM 212 and executed in the image forming apparatus 20. It should be noted that the SD card 80 may be replaced by another recording medium (e.g., a CD-ROM, a universal serial bus (USB) memory, etc.) In other words, a type of recording medium corresponding to the SD card 80 is not limited to a predetermined type. In this case, the SD card slot 27 is replaced by hardware according to the type of the recording medium.

It should be noted that the operation panel 25 may be a device having a CPU and an operating system (OS) independent from the image forming apparatus, such as a dedicated or general-purpose smartphone, tablet terminal, etc. The OS may be an OS typically used in a smartphone, a tablet terminal, etc., such as Android (registered trademark). By using such an OS, it is possible to display the same expressive screens as the smartphone, the tablet terminal, etc., and provide the same operability as the smartphone, the tablet terminal, etc. However, the operation panel 25 may be realized by another device.

FIG. 4 is a drawing illustrating a functional structure of the user terminal 10 and the image forming apparatus 20 according to an embodiment. As shown in FIG. 4, the image forming apparatus 20 includes a panel control unit 221, a screen configuration reading unit 222, a screen configuration writing unit 223, an authentication unit 225, etc. These units are realized by processes which one or more programs installed in the image forming apparatus 20 cause the CPU 211 to perform. The image forming apparatus 20 uses a screen configuration storage unit 224 and a user information storage unit 226. These storage units can be realized by using, for example, the HDD 214, or storage devices connected to the image forming apparatus 20 via a network.

The panel control unit 221 controls displaying a screen on the operation panel 25. An initial screen or a home screen (hereinafter, collectively referred to as "initial screen") of the various screens displayed on the operation panel 25 is displayed based on screen configuration information stored in the screen configuration storage unit 224. The screen configuration information indicates a configuration of the initial screen. The initial screen is, for example, a screen for starting an operation of the image forming apparatus 20. For example, the initial screen may be a screen initially displayed when the image forming apparatus 20 is ready for operation. The time when the image forming apparatus 20 is ready is the time when start-up of the image forming apparatus 20 is complete or, in the case where authentication is required, when authentication is successful. It should be noted that in an embodiment of the present invention, the screen configuration information is defined for each permission type. The permission type is a type of permission a user has for the image forming apparatus 20. In the following, information indicating the permission type is referred to as "permission type name".

The screen configuration reading unit 222 reads the screen configuration information stored in the screen configuration storage unit 224 in response to a request from a user terminal 10, and transmits the screen configuration information to the user terminal 10. The screen configuration writing unit 223 receives screen configuration information from the user terminal 10, and writes the screen configuration information to the screen configuration storage unit 224. The authentication unit 225 performs authentication of a user (operator) of the image forming apparatus 20 by comparing a user name and a password input via a login screen with information stored in the user information storage unit 226. Further, the authentication unit 225 identifies a permission type name of the authenticated user based on the information stored in the user information storage unit 226. The user information storage unit 226 stores attribute information for each of the users who are permitted to use the image forming apparatus 20. The attribute information includes a user name, a password, a permission type name, etc.

On the other hand, the user terminal 10 includes a screen configuration obtaining unit 11, a screen reproduction unit 12, a screen configuration change unit 13, a screen configuration transmission unit 14, a screen configuration saving unit 15, etc. These units are realized by processes which one or more programs installed in the user terminal 10 cause the CPU 104 to perform. The user terminal 10 also uses a screen configuration storage unit 16. The screen configuration storage unit 16 can be realized by using, for example, the auxiliary storage device 102, or a storage device connectable to the user terminal 10 via a network.

The screen configuration obtaining unit 11 obtains screen configuration information of a change target or an edit target from any one of the image forming apparatuses 20 or the screen configuration storage unit 16. The screen reproduction unit 12 emulates a display process of an initial screen of the panel control unit 221 based on the screen configuration information. In other words, the screen reproduction unit 12 displays an initial screen in the same manner as displayed in the image forming apparatus 20, according to the screen configuration information obtained by the screen configuration obtaining unit 11. The screen configuration change unit 13 changes the screen configuration information in response to a change instruction for the displayed initial screen. The screen configuration transmission unit 14 transmits the changed screen configuration information to a specified image forming apparatus 20. The screen configuration saving unit 15 stores the changed screen configuration information in the screen configuration storage unit 16.

In the following, a procedure will be described which is performed by the user terminal 10. FIG. 5 is a flowchart illustrating an example of a procedure performed by the user terminal 10. It should be noted that a user operates the user terminal 10 in FIG. 5.

For example, when an instruction for obtaining screen configuration information is input by the user, the screen configuration obtaining unit 11 determines whether the obtaining destination, from which screen configuration information specified by the instruction is obtained, is the image forming apparatus 20 or a local file of the user terminal 10 (S101). The local file is, for example, a file stored in the screen configuration storage unit 16. However, the screen configuration information may be stored in the screen configuration storage unit 16 in a data format other than the file format.

In the case where the obtaining destination is the image forming apparatus 20 (YES in S101), the screen configuration obtaining unit 11 accepts an IP address of the destination image forming apparatus 20, input by the user (S102). For example, the screen configuration obtaining unit 11 may display a screen for inputting an IP address, and accept the input IP address via the screen. It should be noted that identification information other than the IP address such as a uniform resource locator (URL) may be input by the user.

Next, the screen configuration obtaining unit 11 obtains from the image forming apparatus 20 specified by the input IP address the screen configuration information stored in the screen configuration storage unit 224 of the image forming apparatus 20 (S103). At this time, the screen configuration obtaining unit 11 obtains the screen configuration information corresponding to the permission type name specified by the user (hereinafter, referred to as "target permission type name"). More specifically, the screen configuration obtaining unit 11 transmits a request, including the target permission type name, for obtaining the screen configuration information to the image forming apparatus 20. In response to the request, the screen configuration reading unit 222 of the image forming apparatus 20 obtains from the screen configuration information stored in the screen configuration storage unit 224 the screen configuration information corresponding to the permission type name included in the request, and transmits the obtained screen configuration information to the image configuration obtaining unit 11. It should be noted that the target permission type name may be specified along with the instruction of obtaining the screen configuration information, or may be input along with the input of the IP address.

FIG. 6 is a drawing illustrating a structure of a screen configuration storage unit 224. As shown in FIG. 6, the screen configuration storage unit 224 stores the screen configuration information for each of the permission type names. In FIG. 6, the permission type names such as "general user", "device administrator", "document administrator", "customer engineer (CE)", etc., are defined. A structure of the screen configuration information is shown, for example, in FIG. 7.

FIG. 7 is a drawing illustrating a structure example of the screen configuration information. Although the screen configuration information is expressed by using a table format for the sake of convenience in FIG. 7, the screen configuration information may be expressed by using eXtensible Markup Language (XML), etc.

As shown in FIG. 7, the screen configuration information includes model information, a background color, banner information, wall paper information, layout information, icon information, wall paper data, icon data, etc. It should be noted that information other than the above may be included in the screen configuration information.

The model information is related to a model of the image forming apparatus 20 to which the screen configuration information can be applied (in which the screen configuration information is effective). For example, a model name is included in the model information. The background color indicates a background color of the initial screen. The banner information indicates a character string displayed in a banner area of the initial screen. The wall paper information indicates image data used as a wall paper (background) of the initial screen (hereinafter, referred to as "wall paper data"). For example, the wall paper information includes identification information of any one of wall paper data items, which will be described later (hereinafter, referred to as "wall paper ID").

The layout information is related to layout of display parts (hereinafter, referred to as "icons") in the initial screen.

The screen configuration information includes the icon information for each of icons included in the initial screen. For example, the icon information for each of the icons includes information indicating a position of the icon.

The wall paper data includes one or more image data items available for a wall paper of the initial screen. The screen configuration information includes a list of the wall paper data items that are encoded. Each of the wall paper data items is associated with a wall paper ID.

The icon data is image data of an icon included as a default (hereinafter, referred to as "icon data"). The screen configuration information includes a list of icon data items corresponding to standard application programs in the image forming apparatus 20, the icon data items, for example, being encoded. Each of the icon data items is associated with identification information (hereinafter, referred to as "icon ID").

As shown in FIG. 7, the layout information includes a number of columns, a number of rows, a number of areas in X direction, a number of areas in Y direction, etc. The number of columns is a number of icons that can be included in an area in a horizontal direction. The number of rows is a number of icons that can be included in an area in a vertical direction. The number of areas in X direction is a number of areas in the horizontal direction. The number of areas in Y direction is a number of areas in the vertical direction. Here, an "area" is a unit of a display range (display area) that can be switched by, for example, a swipe operation, a scroll operation, etc. In FIG. 7, the number of columns=4, the number of rows=2, the number of areas in X direction=1, the number of areas in Y direction=3. In this case, the initial screen has layout as shown in FIG. 8.

FIG. 8 is a drawing illustrating example layout of an initial screen. FIG. 8 shows three areas including a first through third areas in the vertical direction. A display range displayable at a time is one area. Each area includes as many as two rows by four columns (as many as eight) icon positions. Each position has a coordinate value expressed by a format "<area number>-<position number>". The area number is an identification number of an area. The position number is a serial number in an area. In other words, each area includes eight positions in FIG. 8. Therefore, the position number includes values 1 through 8.

Further, the icon information included as a part of the screen configuration information has a structure, for example, shown in FIGS. 9A-9C. FIGS. 9A-9C are drawings illustrating structures of icon information. FIG. 9A is a structure example of icon information corresponding to an application program. FIG. 9B is a structure example of icon information corresponding to a widget. FIG. 9C is a structure example of icon information corresponding to a short-cut. In other words, the icon information has different structures according to the corresponding entities. It should be noted that a type and a position are common items in FIGS. 9A through 9C.

The type is information indicating an entity type corresponding to an icon. For example, "application" indicates an application program; "widget" indicates a widget; and "url" indicates a short-cut for a uniform resource locator (URL). The position indicates a position of an icon by using the coordinate value shown in FIG. 8. The position is (1-3, 1-7) in FIG. 9B, where (1-3, 1-7) indicates that the position is the center of "1-3" and "1-7". Further, it is possible to specify a position by using (1-7, (+0%, +30%)). This indicates a position with 0% deviation in X direction and +30% deviation in Y direction, with respect to the position "1-7". Further, a position of a nondisplay icon is indicated by "0-0".

The icon information shown in FIG. 9A further includes an icon ID, an application ID, and a name. The icon ID is an ID for any one of icon data items included in the screen configuration information. In other words, an icon corresponding to the icon information is displayed by using icon data corresponding to the icon ID. The application ID is an ID of an application program corresponding to the icon, and the application program is used in the image forming apparatus 20 when the icon is operated. The name is a display name of an icon.

The icon information shown in FIG. 9B further includes an application ID and icon data. The application ID is an ID of a widget corresponding to the icon. The icon data is icon data itself, being encoded, used for displaying the icon corresponding to the icon information.

The icon information shown in FIG. 9C further includes a url and icon data. The url is a reference destination URL. The icon data is icon data itself, being encoded, used for displaying the icon corresponding to the icon information.

In step S103 of FIG. 5, the screen configuration information as illustrated in FIGS. 7 through 9 is obtained.

On the other hand, in the case where the obtaining destination is the local file (NO in S101), the screen configuration obtaining unit 11 accepts a file name input by the user (S104). Here, it is assumed that the file name includes a permission type name corresponding to the screen configuration information. Therefore, the act of inputting a file name also specifies a permission type name.

Next, the screen configuration obtaining unit 11 obtains the screen configuration information from a file of the files stored in the screen configuration storage unit 16, corresponding to the input file name (S105). The obtained screen configuration information also has the structure as illustrated in FIGS. 7 through 9. It should be noted that the file name includes the permission type name. Therefore, the screen configuration information obtained here corresponds to the permission type name included in the file name.

It should be noted that the steps S104 and S105 are useful procedures in the case where, for example, an image forming apparatus 20 is not delivered, and yet it is necessary to customize the screen configuration information in advance for the to-be-delivered image forming apparatus 20. Further, the steps S104 and S105 are also useful in the case where screen configuration information has already been customized for an image forming apparatus 20, and the screen configuration information is utilized for creating screen configuration information for another image forming apparatus 20.

Following step S103 or S105, the screen reproduction unit 12 displays on the display device 106 an edit screen including an initial screen based on the obtained screen configuration information (S106).

FIG. 10 is a drawing illustrating a display example of an edit screen 510. As shown in FIG. 10, the edit screen 510 includes a display area 511 and a menu area 512. The display area 511 is used for reproduction of an initial screen 610 according to the screen configuration information. In other words, the initial screen 610 is displayed in the display area 511 in the same way as it is displayed on the operation panel 25 of the image forming apparatus 20. The menu area 512 is used for accepting various operations.

The initial screen 610 includes an icon area 611 in which icons are disposed and a banner area 612 in which banner information is displayed. As shown in FIG. 10, the icon area 611 includes seven icons such as "Copy", "Scan", "Fax", "Doc", "Address", "Config", and "Weather". When any one of the icons is selected in a state where the initial screen 610 is displayed in the image forming apparatus 20, a process corresponding to an application ID or a url included in the icon information of the selected icon is performed. Further, a message or the like is displayed in the banner area 612, which should be reported to the user of the image forming apparatus 20.

When an instruction for changing the configuration of the initial screen 610 is input by the user (YES in S107), the screen configuration change unit 13 applies the change corresponding to the instruction to the screen configuration information (S108). For example, the user can change a position of an icon by dragging the icon on the initial screen 610 displayed in the display area 511. In the case where there is another icon at the position to which the icon is dragged, positions of the icon and the other icon are interchanged. In this case, the position value(s) of the icon information of the position-changed icon(s) is(are) changed. Further, when a Delete key is pressed in a state where any one of the icons is selected, the screen configuration change unit 13 changes the position value of the icon information of the selected icon to "0-0".

Further, when right click is performed on any one of the icons, the screen configuration change unit 13 displays a context menu including menu items such as "change icon" and "change name". When "change icon" in the context menu is selected, it becomes possible to change icon data. For example, icon data stored in the auxiliary storage device 102 of the user terminal 10 can be added as icon data of the screen configuration information. The added icon data can become the icon data for the icon on which the right click is performed.

Further, when "change name" is selected, it becomes possible to change the name of the icon information. It should be noted that a menu item "return to previous icon setting" may be included in the context menu. In the case where the menu item "return to previous icon setting" is selected, the screen configuration change unit 13 may cancel the change of the icon data or the change of the name and return it to the previous state.

Further, when the menu area 512 is operated, the screen configuration change unit 13 displays in the menu area 512 a list of wall paper data items included in the screen configuration information. When any one of the wall paper data items is selected from the list, a wall paper ID of the selected wall paper data item is overwritten as wall paper information of the screen configuration information. As a result, the wall paper of the initial screen 610 is changed. Further, the image data stored in the auxiliary storage device 102 of the user terminal 10 may be added to the wall paper data of the screen configuration information. As a result, the image data stored in the auxiliary storage device 102 can be used as the wall paper data of the initial screen 610.

As a result of the change (editing) described above, the initial screen 610 is changed, for example, as shown in FIG. 11. FIG. 11 is a drawing illustrating a display example of an edit screen including a changed initial screen 610*a*.

The changed initial screen 610*a* is shown in the display area 511 of the edit screen 510 in FIG. 11. In the initial screen 610*a*, an icon position is changed, icon data is changed, wall paper is changed, and so on. Specifically, icon data items of the icons "Fax" and "Doc" are changed, and the icon "Config" is deleted. Regarding the icon "Doc", the name is also changed. Further, regarding the icon "Weather", the size is also changed.

Next, when there is no change instruction (NO in S107) and an IP address of a transmission destination of the changed screen configuration information is input (YES in S109), the screen configuration transmission unit 14 transmits the changed screen configuration information (that is, a change result of the screen configuration information) and the target permission type name to the image forming apparatus 20 corresponding to the input IP address (S110). Upon receiving the screen configuration information and the target permission type name, the screen configuration writing unit 223 of the image forming apparatus 20 stores in the screen configuration storage unit 224 the received screen configuration information in a record corresponding to the received target permission type name. At this time, the original screen configuration information may be overwritten by the received screen configuration information.

It should be noted that step S110 may be repeated multiple times. In other words, the same screen configuration information may be applied to multiple image forming apparatuses 20.

When an input of IP addresses is ended (NO in S109) and an instruction for saving the screen configuration information is input (YES in S111), the screen configuration saving unit 15 stores the changed screen configuration information in the screen configuration storage unit 16 by associating the changed screen configuration information with the target permission type name (S112). The screen configuration information stored in the screen configuration storage unit 16 becomes a selection candidate in the next steps S104 and S105. Further, screen configuration information for another image forming apparatus 20 may be created based on the screen configuration information stored in the screen configuration storage unit 16. Further, based on the screen configuration information for a permission type name, screen configuration information for another permission type name may be created.

The screen configuration information is created for each of the permission type names. As a result, information shown, for example, in FIG. 12 is stored in the screen configuration storage unit 224.

FIG. 12 is a drawing illustrating the screen configuration information for each of the permission type names. As shown in FIG. 12, the screen configuration information item for a different permission type name has different banner information, a different background color, a different wall paper, etc.

Next, a procedure performed by the image forming apparatus 20 will be described. FIG. 13 is a flowchart illustrating an example of a procedure performed by the image forming apparatus 20.

For example, when a login request is input by a user via a login screen displayed on the operation panel 25 (S201), the authentication unit 225 performs authentication of a user name and a password input in the login screen by referring to the user information storage unit 226 (S202).

FIG. 14 is a drawing illustrating a structure example of the user information storage unit 226. As shown in FIG. 14, the user information storage unit 226 stores a user name, a password, a permission type name, etc., for each user. The authentication unit 225 determines that the authentication is successful when the same user name and the password as input in the login screen are included in a record stored in the user information storage unit 226; and otherwise, determines that the authentication is not successful. It should be noted that, in the case where card-based authentication or biometric authentication is used, relevant information for the authentication method may be stored in the user information storage unit 226.

In the case where the authentication is successful (YES in S203), the authentication unit 225 identifies the permission type name of the authenticated user (hereinafter, referred to as "login user") by referring to the user information storage unit 226 (S204). Specifically, the permission type name, stored in the user information storage unit 226, associated with the user name of the login user is identified. The authentication unit 225 transmits to the panel control unit 221 a request for displaying the initial screen 610 along with the identified permission type name. In response to the transmission from the authentication unit 225, the panel control unit 221 displays the initial screen 610 on the operation panel 25 based on the screen configuration information, stored in the screen configuration storage 224, associated with the permission type name (S206).

FIG. 15 is a drawing illustrating a first display example of the initial screen 610. FIG. 15 shows an example of the initial screen 610 displayed in the case where the permission type name of the login user is "general user".

Further, in the case where the permission type name of the login user is "device administrator", for example, the initial screen 610 as shown in FIG. 16 is displayed. FIG. 16 is a drawing illustrating a second display example of the initial screen 610.

Further, in the case where the permission type name of the login user is "CE", for example, the initial screen 610 as shown in FIG. 17 is displayed. FIG. 17 is a drawing illustrating a third display example of the initial screen 610.

It should be noted that availability of operations, after the initial screen 610 is displayed, is determined based on the permission type name of the login user. For example, use availability of functions of the image forming apparatus 20, associated with the permission type name, may be stored in the HDD 214, etc.

As described above, according to an embodiment of the present invention, the screen configuration information can be set for each permission type. Therefore, compared with the case where the screen configuration information is set for each user, workload for changing a configuration of a screen displayed on the image forming apparatus 20 can be reduced.

Further, according to an embodiment of the present invention, a user can change the screen configuration information of the initial screen by using a user terminal 10. The changed screen configuration information can be applied to, not only the image forming apparatus 20 of the original screen configuration information, but also other image forming apparatuses 20. In other words, initial screen configurations of multiple image forming apparatuses 20 can be changed by changing a single set of screen configuration information. Therefore, the workload for changing the configuration of a screen displayed on the image forming apparatus 20 can be reduced.

It should be noted that an embodiment of the present invention may be applied to a screen displayed in an apparatus other than the image forming apparatus 20. For example, an embodiment of the present invention may be applied to a projector, a video conference system, a digital camera, or the like.

It should be noted that the authentication unit 225 is an example of an identifying unit. The panel control unit 221 is an example of a display control unit. The user terminal 10 is an example of an information processing apparatus. The screen configuration reading unit 222 is an example of a transmission unit. The screen configuration writing unit 223 is an example of a reception unit.

As described above, an embodiment of the present invention has been described in detail. The present invention is not limited to the specific embodiment and various variations and modifications can be made within the scope of the present invention described in the claim.

The present application is based on and claims the benefit of priority of Japanese Priority Application No. 2015-125388 filed on Jun. 23, 2015, the entire contents of which are hereby incorporated by reference.

REFERENCE SIGNS LIST 10 user terminal
11 screen configuration obtaining unit
12 screen reproduction unit
13 screen configuration change unit
14 screen configuration transmission unit
15 screen configuration saving unit
16 screen configuration storage unit
20 image forming apparatus
21 controller
22 scanner
23 printer
24 modem
25 operation panel
26 network interface
27 SD card slot
80 SD card
100 drive device
101 recording medium
102 auxiliary storage device
103 memory device
104 CPU
105 interface device
106 display device
107 input device
211 CPU
212 RAM
213 ROM
214 HDD
215 NVRAM
221 panel control unit
222 screen configuration reading unit
223 screen configuration writing unit
224 screen configuration storage unit
225 authentication unit
226 user information storage unit
B Bus

The invention claimed is:

1. An apparatus operable according to a plurality of different permission types, the apparatus comprising:
a processing circuitry that is coupled to a memory and configured to,
by referring to information in which a permission type a user of the apparatus has with respect to an operation of the apparatus is indicated for identification information of the user, identify the permission type corresponding to the identification information input by the user, and
display a screen based on screen configuration information corresponding to the permission type identified by the processing circuitry in such a way that it is recognizable which permission type of the user the operation of the apparatus is based on, wherein the screen configuration information corresponding to the permission type is stored in the memory; and
a transceiver configured to,
in response to a request from an information processing apparatus connected via a network, transmit the screen configuration information stored in the memory to the information processing apparatus,
receive from the information processing apparatus a change result of the screen configuration information changed by the information processing apparatus, and
store the change result in the memory,
wherein, when transmitting the screen configuration information to the information processing apparatus, the transceiver transmits to the information processing apparatus the screen configuration information corresponding to the permission type specified, from the plurality of different permission types, in the request by the information processing apparatus, and
wherein, by displaying banner information corresponding to the permission type, the banner information corresponding to the permission type being included in the screen configuration information, the processing circuitry displays the screen in such a way that it is recognizable which permission type of the user the operation of the apparatus is based on.

2. The apparatus according to claim 1, wherein the transceiver stores the change result in the memory by associating the change result with the permission type received from the information processing apparatus.

3. The apparatus according to claim 1, wherein the transceiver is further configured to receive from the information processing apparatus the change result of the screen configuration information changed by the information processing apparatus including an emulator for emulating a screen of the apparatus.

4. The apparatus according to claim 1, wherein at least one of a background color and a wall paper included in the screen configuration information is different for each permission type.

5. An information processing system comprising:
an apparatus operable according to a plurality of different permission types; and an information processing apparatus, wherein
the apparatus includes
a processing circuitry that is coupled to a memory and configured to,
by referring to information in which a permission type a user of the apparatus has with respect to an operation of the apparatus is indicated for identification information of the user, identify the permission type corresponding to the identification information input by the user, and
display a screen based on a screen configuration information corresponding to the permission type identified by the processing circuitry in such a way that it is recognizable which permission type of the user the operation of the apparatus is based on, wherein the screen configuration information corresponding to the permission type is stored in the memory; and
transceiver configured to,
in response to a request from the information processing apparatus, transmit the screen configuration information stored in the memory,
receive from the information processing apparatus a change result of the screen configuration information changed by the information processing apparatus, and
store the change result in the memory,
wherein, when transmitting the screen configuration information to the information processing apparatus, the transmission unit transmits to the information processing apparatus the screen configuration information corresponding to the permission type specified, from the plurality of different permission types, in the request by the information processing apparatus, and wherein,
by displaying banner information corresponding to the permission type, the banner information corresponding to the permission type being included in the screen configuration information, the processing circuitry displays the screen in such a way that it is recognizable which permission type of the user the operation of the apparatus is based on.

6. An information processing method for an apparatus operable according to a plurality of different permission types, the apparatus performing:
an identifying step of, by referring to information in which a permission type a user of the apparatus has with respect to an operation of the apparatus is indicated for identification information of the user, identifying the permission type corresponding to the identification information input by the user;

a display step of displaying a screen based on a screen configuration information corresponding to the permission type identified by the identifying step in such a way that it is recognizable which permission type of the user the operation of the apparatus is based on, wherein the screen configuration information corresponding to the permission type is stored in a memory;
a transmission step of, in response to a request from an information processing apparatus connected via a network, transmitting the screen configuration information stored in the memory to the information processing apparatus; and
a receiving step of receiving from the information processing apparatus a change result of the screen configuration information changed by the information processing apparatus and storing the change result in the memory,
wherein, when transmitting the screen configuration information to the information processing apparatus, the transmission step includes transmitting to the information processing apparatus the screen configuration information corresponding to the permission type specified, from the plurality of different permission types, in the request by the information processing apparatus, and
wherein, by displaying banner information corresponding to the permission type, the banner information corresponding to the permission type being included in the screen configuration information, the display step displays the screen in such a way that it is recognizable which permission type of the user the operation of the apparatus is based on.

7. The information processing method according to claim 6, wherein the reception step includes storing the change result in the memory by associating the change result with the permission type received from the information processing apparatus.

8. The info nation processing method according to claim 6, further comprising:
a reception step of receiving from the information processing apparatus a change result of the screen configuration information changed by the information processing apparatus including an emulator for emulating a screen of the apparatus.

9. The information processing method according to claim 6, wherein at least one of a background color and a wall paper included in the screen configuration information is different for each permission type.

10. A computer program product comprising a non-transitory computer readable medium having computer usable program code for an apparatus operable according to a plurality of different permission types, the apparatus performing the information processing method according to claim 6.

* * * * *